United States Patent

[11] 3,614,124

| [72] | Inventor | Carl W. Schwabenlender<br>Milwaukee, Wis. |
|---|---|---|
| [21] | Appl. No. | 845,383 |
| [22] | Filed | July 28, 1969 |
| [45] | Patented | Oct. 19, 1971 |
| [73] | Assignee | A. O. Smith Corporation<br>Milwaukee, Wis. |

[54] VEHICLE FRAME UNIT
10 Claims, 8 Drawing Figs.

[52] U.S. Cl. ........................................... 280/106
[51] Int. Cl. ...................................... B62d 21/00
[50] Field of Search ............................. 280/106;
296/28.2, 28.4

[56] References Cited
UNITED STATES PATENTS

| 3,088,749 | 5/1963 | Schilberg | 280/106 |
| 3,105,701 | 10/1963 | Schilberg | 280/106 |
| 3,129,954 | 4/1964 | Duero | 280/106 |
| 3,264,010 | 8/1966 | Pierce | 280/106 |

*Primary Examiner*—Philip Goodman
*Attorney*—Andrus, Sceales, Starke & Sawall

ABSTRACT: This disclosure includes a vehicle frame having a single center rail member and a separate and single rear rail member in each side of the frame structure. The rail members are channel shaped and open in horizontally opposite directions. The members have complementing curved adjacent and telescoped ends which produce an interconnecting box section. The side rail units are interconnected to the body and to the suspension system to remove the torsion deflection from the rear rail member and as a result of shifting such force inputs, obtain the desired torsional and flexural strength in the frame.

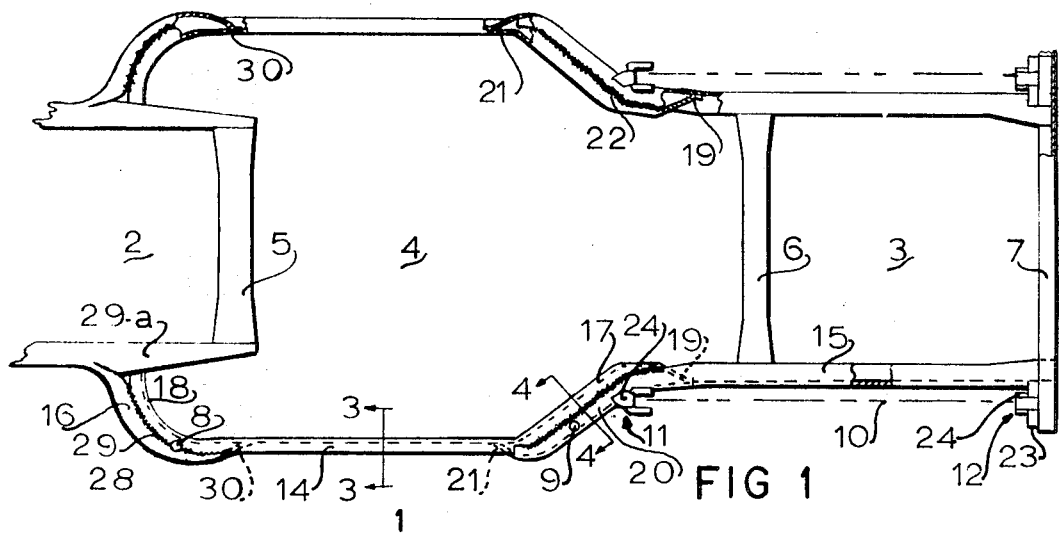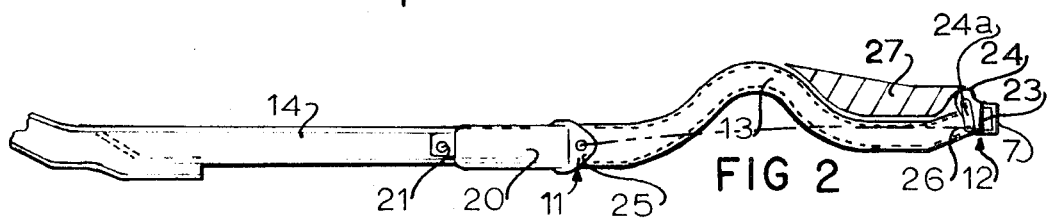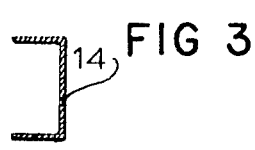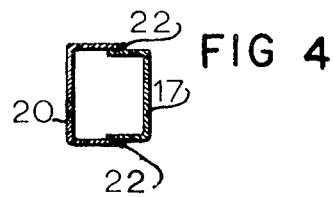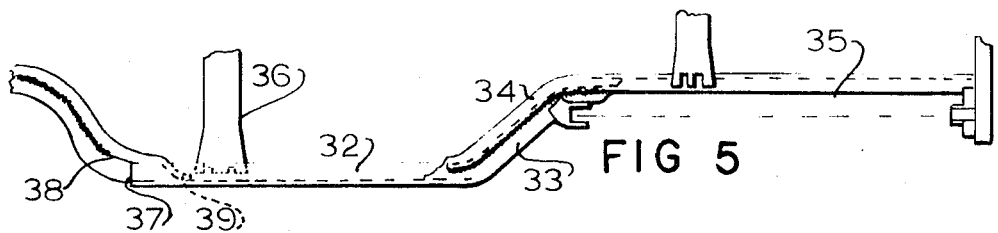

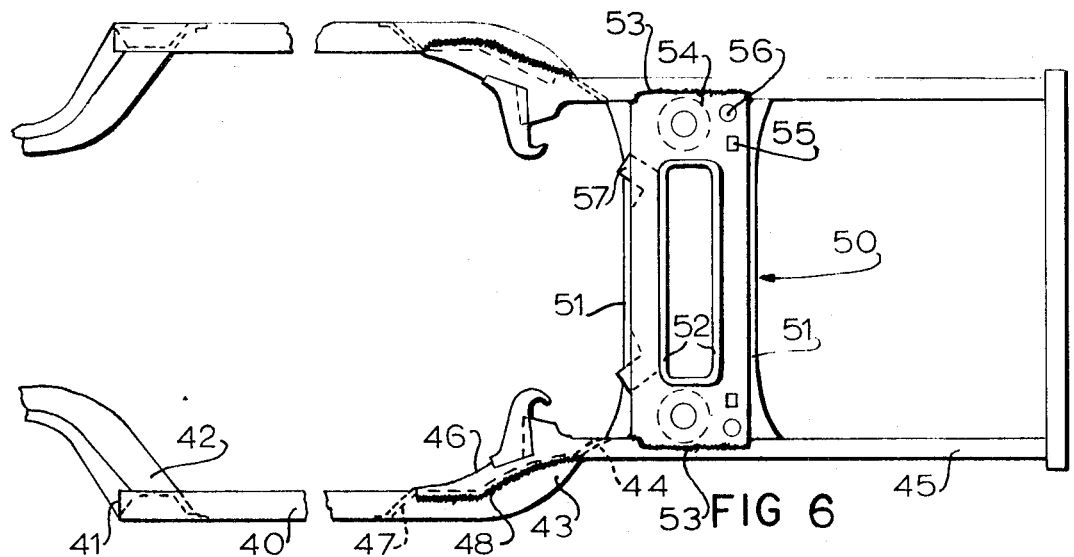
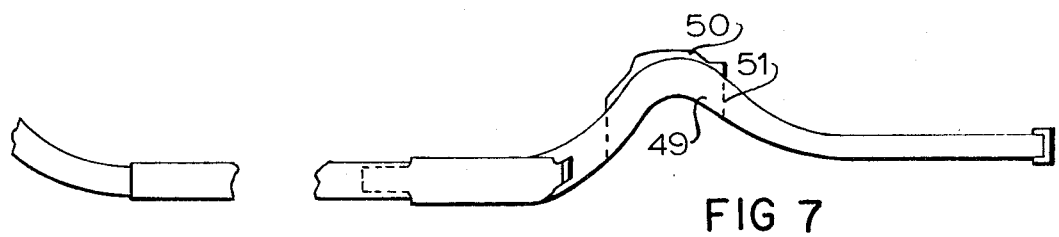
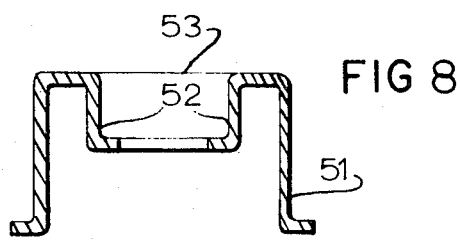

VEHICLE FRAME UNIT

This invention relates to frame structures for automotive vehicles and particularly to a separate frame structure to which the body is interconnected to provide a rigid supporting system.

Automotive vehicles and the like may be employed with a unitized body frame construction or with a separate frame and body construction. In the unitized construction, the body structure is formed with an integrated supporting member to which the wheel mountings and the like are secured. Completely separate underframe structures, to which a body member is separately secured, have certain advantages. In such structures, the body is secured to the frame by suitable connections to isolate the body from vibrations and the road noise and the like.

The separate frame structure may take any one of a variety of different forms. For example, an offset center side member construction may advantageously be employed to permit lowering of a body structure.

U.S. Pat. No. 3,105,701 to A. G. Schilberg discloses an offset-type frame construction having full length side rail members interconnected by cross bracing in appropriate locations to permit mounting of the engine and the wheel suspension system. The body is generally secured to the junction between the center side members and the fore-and-aft side members of the frame structure. The rear suspension system may be of the leaf spring construction or alternatives may be provided with a coil and link rear suspension. Generally, in the several different offset constructions, the frame structure includes an offset central or center side rail member portion interconnected to an inwardly set forward rail portion and a correspondingly inwardly set aft rail portion. In the leaf spring-type construction, the rear springs are generally interconnected to the frame structure by hangers secured to the forward end of the aft rail portion and the underside of the trailing portion thereof. The forward rail portions carry the engine and the usual independent coil and the front wheel suspension.

In the separate frame and body construction, the interconnection must be such as to properly support the body loads in reaction to the suspension. Generally, the connecting frame structure must transmit internal forces or loads and moments without establishing excessive torsional or flexural deflection of the frame side rail members. If the frame is excessively limber, relatively high stress levels may result in the frame components as well as the body parts which are then forced to carry a disportionate share of the load. Excessive deflections will also result in undesirable vibrating or shaking of the vehicle under operating conditions. As a result, the offset structures, particularly in the aft rail portions and the interconnection thereof to the side rail portions, must possess sufficient flexural and torsional rigidities to absorb and carrying the bending and twisting loads. The required flexural stiffness is normally obtained by employing channel-shaped members which open horizontally to provide horizontal stiffening flanges. The torsional stiffness on the other hand, is obtained by providing a boxed structural member throughout the side rail members.

Many current body structures provide sufficient torsional stiffness such that the adjacent center side members need only absorb the flexural deflections. In such cases, the center side members are generally not boxed but only flanged. In any event, the rear side members and the interconnection between the center side rails and the forward and the aft aide rails are formed with a boxed cross section. Generally, they are formed by telescoped channel members which are interconnected to each other by welding or the like.

Although such frame structures are highly satisfactory from an operating and functional standpoint, they do require added expense to construct, both from a standpoint of material and time. The integrated structure, such as shown in the Schilberg patent, which employs an integrated center member and aft member, has the advantage of reducing the number of frame components and the required interconnecting expense. However, the integrated structures generally require the use of a constant metal thickness and the front and rear aide members are thus an excessive material which is not performing any necessary function.

The present invention is particularly directed to an improved separate frame structure which can be directly applied for any one of the usual offset vehicle frames which the various suspensions, Generally, in accordance with the present invention, a single center side rail member and a single rear rail member is provided for each side of the frame structure. The rail members are generally channel shaped and have complementing curved interconnecting adjacent ends which produce interconnecting box sections. The side rail portions are interconnected with each other to the body and to the suspension system in such a manner that the center side rail member and the rear rail member maintain the necessary torsional and flexural support without the necessity of the auxiliary rear rail members presently employed in vehicle frames. This results in an appreciable reduction in the material cost and time of manufacture as well as in a related increase in production rate, The input and reaction forces are shifted to permit and maintain the desired torsional and flexural strength and rigidity.

Thus, in an offset center frame member employing the usual leaf spring suspension, the rear hangers are moved to the outermost end of the aft cross member and interconnected to bypass the rear rail members. This results in eliminating a requirement of high torsional stiffness in the rear rail members. As a result, the rear rail member need merely take care of the flexural strength or stiffness which is provided by the use of a single channel-shaped cross section. The interconnecting overlapping junction of the rear rail member and the center rail member define the box section which maintains torsional stiffness. The leaf suspension may therefore be interconnected at that point and maintain overall torsional and flexural characteristics. This structure eliminates the required welding along the long length of the rear rail portion of the frame structure with a consequent reduction in labor and material cost.

In this latter construction, applicant has also found that the trunk capacity may be increased. Thus, the leaf spring hanger may be secured to the aftmost cross brace and disposed to the side of the side rail member such that the very top of the rail member is essentially at the same elevation as the spring. The rearward portion of the rear rail member may then be dropped with a corresponding increase in the trunk volume.

The present invention has its greatest advantage in offset frame structures employing a leaf spring rear suspension, a short rear deck and front inner rail transmission crossbar mountings. However, significant advantages also result when employed in the outer types, such as a coil link-type rear suspension and the center side bar transmission crossbar mounting.

If the present invention is applied to a typical perimeter frame having a coil link rear suspension, the same generally channel shaped construction can be employed. The rear side rail member, however, is previously noted, has relatively low torsional resistance and a special cross member unit is provided. The cross member is designed to act as a flexurally rigid beam is pinned to the body at opposite ends by the body mounts. The cross member absorbs the spring and shock loads without torsional assistance from the rear side rail members.

The present invention thus provides a highly satisfactory means of manufacture which is relatively inexpensive and which is highly suited for assembly line fabrication with existing frame forming and connecting equipment.

The drawings furnished herewith illustrate preferred constructions of the present invention in which the above advantages and features are clearly disclosed, as well as others which will be readily understood from the following description.

IN THE DRAWING

FIG. 1 is a diagrammatic plan view of a center offset or wide-hipped frame structure embodying the present invention;

FIG. 2 is a side view of the frame structure shown in FIG. 1;

FIG. 3 is a vertical section taken generally on lines 3—3 of FIG. 1;

FIG. 4 is a similar vertical section taken generally on lines 4—4 of FIG. 1;

FIG. 5 is a fragmentary view if half of a frame structure, such as shown in FIG. 1, with a through type transmission crossbar;

FIG. 6 is a fragmentary plan view illustrating the present invention applied to a perimeter type frame structure for a coil link rear suspension system;

FIG. 7 is a fragmentary side elevational view of the structure shown in FIG. 6, and FIG. 8 is a vertical cross section taken generally on lines 8—8 of FIG. 6.

Referring to the drawings and particularly to FIG. 1, the present invention is shown incorporated in an offset frame or structure for an automobile or similar vehicle. Generally, the frame unit includes similar side rail units 1 extending lengthwise of the frame with a forward frame section 2, and aft frame section 3 interconnected with a centrally located wide or offset section 4. A front cross brace assembly 5 interconnects the forward frame section 2 to provide support for the transmission. The frame structure of the forward wheel mounting assembly is not shown. The aft frame section 3 is interconnected by a pair of longitudinally spaced rear cross braces or bars 6 and 7, the latter of which is connected directly to the rearmost end of the side rail units 1. The body, nor shown, is secured to the side rail units 1 bay a mounting 8 at the forward junction of the offset section 4 to the forward section 2 and a mounting 9 at the rear junction of the offset section 4 to the aft section 3. The mounting is provided through any suitable mounting means, nor shown, such as the usual noise and vibration alleviation coupling presently employed. A rear spring assembly 10 is suspended between a forward or front hanger 11 connected to a curved junction of the aft frame section 3 and the central wide frame section 4. A rear hanger 12, in accordance with the present invention, is interconnected to the rear crossbar 7 immediately adjacent to the side rail unit for purposes more fully discussed hereinafter. The side rail units 1 similarly include, in aft frame section 3, suitable kickup portions 13, shown in FIG. 2, for the usual wheel axle movement.

The present invention is particularly directed to the construction of the side rail units 1 which are generally similarly constructed and thus a single one of the units is described in detail.

Generally, the side rail unit 1 includes a center side rail member 14 interconnected at the opposite ends to a rear side rail member 15 and a front rail member 15.

The center rail member 14 is a channel shaped member. All channels are U-shaped and interconnected in the side rail unit 1, opening horizontally outwardly. The member 14 includes an inwardly curved aft end 17 and an inwardly curved forward end 18 generally formed to correspond to the inwardly offset construction of the forward frame section 2 and the aft frame section 3.

The vertical web portion of the rail member 14 extends outwardly and rearwardly to define a mounting flange portion 19 projecting into and abutting the web of the rear side rail member 15 to which it is secured by a suitable weld or the like.

The rear side rail member 15 is also generally channel shaped metal member which opens horizontally inwardly. The forward end of the rail member 15 is formed as a curved portion 20 which generally complements the curved 20 or end 17 of the center side rail member 14. The forwardmost end of the rail member 15 has its web portion extended to define a mounting flange 21 projecting inwardly into engagement with the web or base of the center side rail member 14. The curved portions 17 and 20 are telescoped with the center side rail member projecting slightly inwardly into the rear side rail member. The overlapping flanges are interconnected by a suitable weld 22.

The boxlike cross section in the curved portion provides the required torsional and flexural rigidity immediately adjacent the body mount 9. Extending from the interconnected curved portions 17 and 20 are the channel shaped rail members 14 and 15. Although they do not provide a boxlike cross section and thus do not produce torsional rigidity, applicant has found that they provide a completely satisfactory support by moving of the rear suspension support from the side rail members to the crossbar 7.

Thus, in the illustrated embodiment of the invention, the rear hanger 12 includes a base portion 23 secured within the channel-shaped crossbar 7, which opens horizontally forwardly of the frame and particularly the side rail units 1. The trailingmost end of the rear side rail member 15 projects into and is welded or otherwise rigidly interconnected to the crossbar 7. The crossbar 7 in turn extends laterally outwardly of the rail member to receive the base 23 of the rear hanger 12 which is welded or otherwise rigidly attached therein. The hanger 12 includes an upwardly curved mounting portion 24 which curves upwardly and forwardly and terminates in a mounting connection to the spring 10 immediately above the level of the rear side rail member 15, as shown in FIG. 2. The forward hanger 11 is constructed in accordance with the usual construction and includes a U-shaped portion 25 telescoped over the rear rail member 15 immediately adjacent the outwardly curved portion 20. The rear rail member, as previously noted, includes the kickup portion 13 and furthermore includes an upwardly curved rear portion 26. This locates the portion of the rear rail member between the kickup portion 13 and the portion 26 below the normal level heretofore employed. The spring is secured to the upwardly curved rear portion 24 by a depending spring arm 242. The leaf spring centerline 10 is diagrammatically illustrated in the uppermost position and is seen to fall below the uppermost edge of the portion 26. This structure thereby provides increased trunk space by approximately the phantom illustrated portion 27 in FIG. 2.

The direct attachment of the rear hanger 12 to the crossbar 7 thus transmits the rear hanger load, which is primarily a vertical type load and substantially less than that at the front hanger 11, directly into the rearwardmost crossbar 7. The rear crossbar 7, which is formed with the channel shaped cross section, essentially resists the load as a result of its flexural rigidity and thereby essentially completely bypasses the rear side rail member 15 in the corresponding frame portion. As a result, the corresponding portion of the rear rail member 15 need not have high torsional stiffness.

The principal load of the rear suspension, as previously noted, is applied to the front hanger 11 of the rear suspension and thus throughout the corresponding frame portion. To absorb both the torsional and flexural loads, the boxlike section is established by the overlapped and welded integral curved portions 17 and 20 of the respective rail members 14 and 15.

The illustrated two-piece construction of the side rail member 14 and the rear side rail member 15 with the integral overlapping portions 17 and 20 produces a substantial cost reduction, Thus, the long length of the rear side rail member 15 need not be boxed, as has been generally taught in prior practical applications and usage. This results in a savings, not only from the elimination of the long length weld along the complete overlapping contiguous portions of the rear rail members, but reduces the material cost by the corresponding elimination of the second overlapping rear rail members. In addition, the design permits the improved dropping of the rear rail member to increase the trunk capacity if so desired.

In accordance with the preferred construction of the present invention, the front side rail member 16 forming a part of the forward frame section 2, includes an outwardly and integral curved portion 28 which complements the inwardly curved end or portion 18 of the side rail member 14. The curved portion 28 has a channel-shaped cross section opening inwardly of the frame and having a vertical depth somewhat less than that of the side rail member 14 and particularly portion 18. The curved portion 28 telescopes slightly into the portion 18 and is interconnected thereto by a suitable weld 29. The curved portion 28 projects outwardly from a straight frame portion 29a of the forward section 2. The end of the curved potion 18 of the side rail member 14 projects inwardly into, and is connected to, such straight extension.

The curved portion 28 of the front side rail member 16 terminates in a mounting flange 30 which projects inwardly into and abutting the base or web of the straight portion of the central side member 14 and is interconnected thereto as by a suitable weld or the like.

Thus, the interconnection of the front side rail member 16 and the center side rail member 14 by the overlapping portions 28, and 28, define a box section to establish and maintain the proper torsional and flexural rigidity at the corresponding point for mounting of the body in an isolated manner while absorbing body loads and the like.

Thus, the present invention provides a side rail member having integral means particularly adapted for interconnection to the similar single piece and front rail members.

The one-piece center member with the attachment to the supporting structure results in very substantial economy. The use of a single central side member connected directly to the fore-and-aft members substantially reduces the tool costs as a result of the reduction in the number of components being made. However, the structure of this invention does not create the disadvantage of a signal continuous side member where a similar material must be used in both the center side member and the rear rail member as has been heretofore suggested, Thus, it permits the use of a lighter gauge metal in the rear rail member. The present invention will also increase the production rate of frame assembly as well as to reduce the fixturing cost as it merely requires the fixturing of the single central side rail member.

The reduction in fixturing and component parts is graphically illustrated by noting that a three-piece center rail design, where portions 14 17 and 18 are separate parts, requires b parts per frame with separate blanking and forming of each part. Thus, the three-piece center rail design with the interconnecting box sections in the fore-and-aft sections will require a total of 12 operations per frame whereas the single central integral side rail members of the present invention require only four operations.

Furthermore, the welding costs are substantially reduced as are the storage and inventory costs because of the substantial reduction in the number of parts.

Although the present invention has its maximum benefit in connection with an auto chassis employing a leaf spring rear suspension, a short rear deck and front inner rail transmission crossbar mountings, it can advantageously be employed with other forms of contemporary and prospective frame designs. For example, a central side bar transmission crossbar mounting assembly is shown in FIG. 5. In this embodiment, a central side rail member 32 includes a generally channel-shaped cross section which opens inwardly of the frame structure. The trailing end of member 32 curves inwardly to define an inset curved portion 33. The latter portion mates with a correspondingly outwardly curved portion 34 on a rear side rail member 35 which opens outwardly and is telescoped over the side rail member 32 similar to the interconnection shown in FIGS. 1 and 2. A "through" transmission crossbar 36 spans the frame structure immediately rearwardly of the inset portion defining the forward frame section of the frame unit.

The foremost end of the side rail member 32 terminates in a square end 37. The front inner rail member 38 is an outwardly opening channel section with the rearmost end telescoped into the end 37 of the side rail member. The rail member 38 also includes a flange 39 which projects inwardly into and abuts the base of web of the side rail member 32 and is welded and otherwise secured thereto. Generally, the advantages of the structure shown in FIG. 5 corresponds to those shown in the previous embodiment wherein the suspension means is similar to that disclose in connection with the first embodiment.

In accordance with the broadest aspect of the present invention, it can also be applied to a coil link rear suspension system and a proposed frame structure with such a suspension as shown in FIGS. 6–8. Referring particularly to FIG. 6, the frame structure is again symmetrical about a central axis and consequently the one-half of the frame is described in detail. Generally, each of the side rail units includes a center side rail member 40 which opens inwardly of the frame structure and is provided with a square forward end 41. A front rail member 42 is shown as an outwardly opening channel portion which curves outwardly and is secured within the forwardmost end of the center rail 40. The trailing or rear end of the rail member 40 terminates in a slightly inwardly curved portion 43. The web portion thereof includes a integral flange 44 which projects laterally into an outwardly opening rear rail member 45. The forward end 46 of the rail member 45 curves outwardly into overlapping telescoped relationship with the curved portion 43 of the rail member 40 and includes a web flange 47 extending into and secured to the base of the member 40. The members are interconnected by a suitable weld 48 or the like in the overlapped portion. In this structure, the rear side rail member 45 is unboxed and consequently has very little torsional resistance. In accordance with the present invention, an integral spring and shock absorber cross member 50 is secured for spanning the aft frame section and interconnected to the opposite rear side rail member 45 an the kickup portion 49.

The cross member 50 is a relatively wide member which is shown having depending sidewalls 51 which extend downwardly between the frame rear rail members. The cross member is also shown having a central depressed or offset portion 52 defining central depending sidewalls extending approximately half the distance of the outer sidewalls 51. The structure of crossmember 50 defines a relatively flexurally rigid crossmember structure having mounting cross member portions 53 to the opposite ends thereof immediately adjacent each of the rear rail members 45. As diagrammatically shown in FIG. 6, each mounting portion will provide a spring support location 54, a shock absorber mounting location 55, a body mount location 56, and upper control arm mount 57. By virtue of its increased flexural rigidity, crossmember 50 acts as a beam pinned at its ends by body mounts 56 and is capable of handling spring 54 ans shock 55 loads with little torsional deflection of rear rail member 45.

In FIgs. 6–8, the box section is maintained in the overlapping portions of the center rail member 40 and the rear rail member 45 while the members as such define oppositely opening channel supports, as in the previous embodiment. As previously noted, this construction results in a very substantial economy of design while maintaining the necessary stiffness of the frame structure.

I claim:

1. A side rail unit for a vehicle frame, comprising one-piece center rail member having a channel section opening laterally of the side rail unit, the center rail member having an integral inwardly curved rear terminal end and forming an outermost extremity of the center rail member, a one-piece rear rail member having a channel cross section opening laterally of the side rail unit and oppositely of said center rail member, said rear rail member having an integral outwardly curved forward terminal end complementing said inwardly curved rear end of the center rail member and telescoped therewith and forming an outermost extremity of the rear rail member, and means connecting said curved portions to define a box section in the overlapping curved portions.

2. The vehicle frame side rail unit of claim 1, wherein said center rail member includes an integral inwardly curved forward end, a corresponding curved front rail member telescoped with said inwardly curved forward end, and means connecting said curved portions to define a box section in the overlapping curved portions.

3. The vehicle frame side rail unit of claim 1, wherein said curved ends includes projecting web flanges bent into the mating rail members and weld means connecting the flanges to the rail members.

4. The vehicle frame side rail unit of claim 1, and weld means connecting the edge of said outwardly curved portions to the top and bottom flanges of the inwardly curved rear end.

5. The vehicle frame side rail unit of claim 1, having a crossbar secured to the rearmost end of the rear rail member, said crossbar projecting laterally outwardly thereof, and a spring suspension support connected to the outer end and extending upwardly, said rear rail member having a kickup portion generally in the central portion and a vertically downwardly offset portion between the kickup portion and the crossbar.

6. The vehicle frame side rail unit of claim 1, wherein said rear rail member includes a kickup portion adjacent said box section with the rail member to the opposite sides thereof being generally in the plane of the central side rail member, a rear crossbar connected to the rear end of the rear rail member and having an extension extending laterally outwardly thereof, and rear spring suspension means connected at one end to the box section and at the opposite end to the crossbar adjacent said rear rail member.

7. The vehicle frame side rail unit of claim 1, wherein said rear rail member includes a generally centrally located kickup portion with the rail member to the opposite sides thereof being essentially in the plane of the central side rail member, the rearmost end of the rear rail member being bent upwardly, a rear crossbar connected to the rear end of the rear rail member and extending laterally outwardly thereof, and spring suspension means connected one to the inner end of the box section and one to the rear crossbar adjacent said rear rail member, said suspension means extending upwardly with a spring connection means located immediately above the adjacent rear rail member.

8. The vehicle frame side rail unit of claim 1, for a coil link suspension means, wherein said center rail member opens laterally inwardly of the side rail unit, said rear rail member opens laterally outwardly of the side rail unit, a rear crossbar connected to the rear end of said rear rail member, a crossmember secured to the rear rail member and extending laterally across the rail unit and including mounting surfaces to mount the body and a coil link suspension to the crossmember, said crossmember including depending brace means to alleviate the torsional deflection in the rear portion of the frame.

9. The vehicle frame side rail unit of claim 8, wherein said rear rail member includes a wheel axle kickup portion, said crossmember being secured to the rear rail member at the kickup portion, said crossmember having depending sidewalls extending downwardly adjacent to the web of the rear rail member and being welded thereto and having a central opening with integral depending sidewalls, the ends of the opening being set inwardly of the rear rail member to define said mounting surfaces.

10. A side rail unit for a vehicle frame, comprising a one-piece center rail member having a channel section opening laterally outwardly of the side rail unit, the center rail member having an integral inwardly curved front terminal and forming an outermost forward extremity of the center rail member, a front rail member having a channel cross section opening laterally inwardly of the side rail unit and oppositely of said center rail member, said front rail member having an integral outwardly curved back terminal end complementing said inwardly curved front end of the center rail member and telescoped therewith rail forming an outermost back extremity of the front wall member, and means connecting said curved ends to define a box section in the overlapping curved ends.